United States Patent
Takahashi et al.

(10) Patent No.: US 9,605,121 B2
(45) Date of Patent: Mar. 28, 2017

(54) FILM

(71) Applicant: KURARAY CO., LTD., Kurashiki-shi (JP)

(72) Inventors: Toru Takahashi, Tainai (JP); Atsuhiro Nakahara, Tainai (JP); Hiroshi Ozawa, Tainai (JP); Toru Abe, Tainai (JP); Yusaku Nomoto, Tainai (JP)

(73) Assignee: KURARAY Co., Ltd., Kurashiki-shi (JP)

( * ) Notice: Subject to any disclaimer, the term of this patent is extended or adjusted under 35 U.S.C. 154(b) by 0 days.

(21) Appl. No.: 14/891,544

(22) PCT Filed: May 16, 2014

(86) PCT No.: PCT/JP2014/063039
§ 371 (c)(1),
(2) Date: Nov. 16, 2015

(87) PCT Pub. No.: WO2014/185508
PCT Pub. Date: Nov. 20, 2014

(65) Prior Publication Data
US 2016/0096937 A1 Apr. 7, 2016

(30) Foreign Application Priority Data

May 16, 2013 (JP) .................................. 2013-104430
Jan. 23, 2014 (JP) .................................. 2014-010845

(51) Int. Cl.
C08J 5/18 (2006.01)
C08F 120/14 (2006.01)
C08L 33/12 (2006.01)
C08L 33/10 (2006.01)
G02B 5/30 (2006.01)

(52) U.S. Cl.
CPC ............... *C08J 5/18* (2013.01); *C08F 120/14* (2013.01); *C08L 33/10* (2013.01); *C08L 33/12* (2013.01); *G02B 5/3033* (2013.01); *C08J 2333/06* (2013.01); *C08J 2333/12* (2013.01); *C08J 2369/00* (2013.01); *C08L 2205/025* (2013.01)

(58) Field of Classification Search
None
See application file for complete search history.

(56) References Cited

U.S. PATENT DOCUMENTS

| | | |
|---|---|---|
| 5,132,369 A | 7/1992 | Yasuda et al. |
| 5,218,064 A | 6/1993 | Yasuda et al. |
| 5,280,070 A | 1/1994 | Drzewinski |
| 5,656,704 A | 8/1997 | Wang et al. |
| 5,830,961 A | 11/1998 | Jungling et al. |
| 2003/0166804 A1 | 9/2003 | Yasuda et al. |
| 2009/0274902 A1 | 11/2009 | Kume |
| 2011/0269910 A1 | 11/2011 | Chun et al. |

FOREIGN PATENT DOCUMENTS

| | | |
|---|---|---|
| EP | 0 263 378 | 4/1988 |
| JP | 63-117012 A | 5/1988 |
| JP | 3-263412 A | 11/1991 |
| JP | 6-93049 A | 4/1994 |
| JP | 7-330819 A | 12/1995 |
| JP | 10-139822 A | 5/1998 |
| JP | 10-273505 | 10/1998 |
| JP | 2002-327012 | 11/2002 |
| JP | 2003-246791 A | 9/2003 |
| JP | 2008-15408 | 1/2008 |
| JP | 2010-254730 | 11/2010 |

OTHER PUBLICATIONS

Couper; Lithium Amides as Initiators of Anionic Polymerisation of MethylMethacrylate; European Polymer Journal vol. 34 No. 12 (1998); pp. 1877-1887.*
International Search Report issued on Aug. 5, 2014 for PCT/JP2014/063039 filed on May 16, 2014.
Supplementary European Search Report as received in the corresponding European Patent Application No. 14 79 7245 received on Nov. 10, 2016.

* cited by examiner

*Primary Examiner* — David Buttner
(74) *Attorney, Agent, or Firm* — Oblon, McClelland, Maier & Neustadt, L.L.P.

(57) ABSTRACT

A film is obtained by forming a methacrylic resin composition comprising 100 parts by mass of a methacrylic resin (A) and preferably 1 to 10 parts by mass of a polycarbonate resin, the methacrylic resin (A) having a triad syndiotacticity (rr) of not less than 58%, a weight average molecular weight of 50000 to 150000, a content of fraction having a molecular weight of not less than 200000 of 0.1 to 10% by mass and a content of fraction having a molecular weight of less than 15000 of 0.2 to 5% by mass. A polarizer protective film comprising the above film is obtained.

13 Claims, No Drawings

FILM

TECHNICAL FIELD

The present invention relates to a film. More specifically, the present invention relates to a film comprising a methacrylic resin, the film having a high transparency, a low thermal shrinkage ratio, a uniform thickness and an excellent surface smoothness.

BACKGROUND ART

Various types of resin films are used in liquid crystal display devices. Among these, triacetyl cellulose is commonly used in polarizer protective films. However, a high moisture permeability of a film comprising triacetyl cellulose tends to deteriorate polarizers as the film thickness becomes thinner. Improvement of polarizer protective films has been an issue for thinner liquid crystal displays.

Accordingly, methacrylic resins have been researched as new materials for polarizer protective films. It is known that stretch treatment of a film comprising a methacrylic resin increases toughness of the film (see Patent Document 1). However, a stretched film comprising a methacrylic resin is susceptible to thermal shrinkage because the glass transition temperature of a common methacrylic resin is as low as about 110° C.

Methacrylic resins are known to have higher glass transition temperatures as the syndiotacticity increases. Examples of a method of manufacturing a methacrylic resin having a high syndiotacticity can include those involving anionic polymerization (Patent Documents 2 and 3). However, due to poor formability of a methacrylic resin obtainable by these methods, a film comprising the above methacrylic resin tends to have poor surface smoothness. Although it is known that decreasing molecular weight can improve forming processability, another problem may arise that the mechanical strength of the resulting film is decreased. For this reason, a film comprising a methacrylic resin having a high syndiotacticity has not yet been available for practical use.

CITATION LIST

Patent Literatures

Patent Document 1: JP S57-32942 B
Patent Document 2: JP H10-273505 A
Patent Document 3: JP 2002-327012 A

SUMMARY OF THE INVENTION

Problems to be Resolved by the Invention

An objective of the present invention is to provide a film comprising a methacrylic resin, the film having a high transparency, a small thermal shrinkage ratio, a uniform thickness and an excellent surface smoothness.

Means for Solving the Problem

Extensive studies was conducted to achieve the aforementioned objective, as the result, the present inventors have completed the present invention which includes the following embodiments.

[1] A film comprising a methacrylic resin (A), the methacrylic resin (A) having a triad syndiotacticity (rr) of not less than 58%, a weight average molecular weight of 50000 to 150000, a content of fraction having a molecular weight of not less than 200000 of 0.1 to 10% and a content of fraction having a molecular weight of less than 15000 of 0.2 to 5%.

[2] The film according to [1], wherein the methacrylic resin (A) comprises not less than 99% by mass of a structural unit derived from methyl methacrylate.

[3] The film according to [1] or [2], wherein the methacrylic resin (A) has a melt flow rate of not less than 0.1 g/10 minutes and not more than 10 g/10 minutes as measured at a temperature of 230° C. and a load of 3.8 kg.

[4] A film comprising
100 parts by mass of a methacrylic resin (A) and 1 to 10 parts by mass of a polycarbonate resin, the methacrylic resin (A) having a triad syndiotacticity (rr) of not less than 58%, a weight average molecular weight of 50000 to 150000, a content of fraction having a molecular weight of not less than 200000 of 0.1 to 10% and a content of fraction having a molecular weight of less than 15000 of 0.2 to 5%.

[5] The film according to [4], wherein the methacrylic resin (A) comprises not less than 99% by mass of a structural unit derived from methyl methacrylate.

[6] The film according to [4] or [5], wherein the methacrylic resin (A) has a melt flow rate of not less than 0.1 g/10 minutes and not more than 10 g/10 minutes as measured at a temperature of 230° C. and a load of 3.8 kg.

[7] A polarizer protective film comprising the film according to any one of the above [1] to [6].

[8] A method for manufacturing a film, the method comprising forming a methacrylic resin composition comprising a methacrylic resin (A) having a triad syndiotacticity (rr) of not less than 58%, a weight average molecular weight of 50000 to 150000, a content of fraction having a molecular weight of not less than 200000 of 0.1 to 10% and a content of fraction having a molecular weight of less than 15000 of 0.2 to 5%.

[9] The manufacturing method according to [8], further comprising obtaining the methacrylic resin (A) by an anionic polymerization method.

[10] The manufacturing method according to [8], further comprising obtaining the methacrylic resin (A) by mixing a methacrylic resin (1) with a methacrylic resin (2) different from the methacrylic resin (1).

[11] The manufacturing method according to [8], further comprising obtaining the methacrylic resin (A) by mixing a methacrylic resin (I) manufactured by an anionic polymerization method with a methacrylic resin (II) manufactured by a radical polymerization method.

[12] The manufacturing method according to any one of [8] to [11], further comprising melt-kneading the methacrylic resin (A) and a polycarbonate resin or a polyester resin to obtain the methacrylic resin composition.

Advantageous Effects of the Invention

The film according to the present invention has a high transparency, a small thermal shrinkage ratio, a uniform thickness and an excellent surface smoothness. The film according to the present invention having the properties is suitable for use in a polarizer protective film, a liquid crystal protective plate, a surface material for portable information terminals, a display window protective film for portable information terminals, a light guide film, a front panel for various displays and the like.

Embodiments for Carrying Out the Invention

The film according to one embodiment of the present invention comprises a methacrylic resin (A).

The methacrylic resin (A) constituting the film according to the present invention has a lower limit of a triad syndiotacticity (rr) of 58%, preferably 59%, more preferably 60%, even more preferably 62%, most preferably 65%. In view of film formability, the above methacrylic resin has an upper limit of a triad syndiotacticity (rr) of preferably 99%, more preferably 85%, still more preferably 77%, even more preferably 76%, most preferably 75%. In a case where the syndiotacticity falls within the above ranges, a film may readily be obtained which has a reduced thermal shrinkage ratio, a uniform thickness, an excellent surface smoothness and a high surface hardness.

The triad syndiotacticity (rr) used herein (hereinafter may simply be referred to as "syndiotacticity (rr)") refers to a percentage where two diads which are linkage of consecutive two structural units in a triad which is linkages of consecutive three structural units are both in racemo (denoted as rr). Note that the diad which is the linkage of the two structural units in a polymer molecule having the same steric configuration are called meso, and otherwise called racemo, which are denoted as m and r, respectively.

The triad syndiotacticity (rr) (%) of a methacrylic resin can be calculated by obtaining a $^1$H-NMR spectrum in deuterated chloroform at 30° C.; determining an area (X) of a region between 0.6 and 0.95 ppm and an area (Y) of a region between 0.6 and 1.35 ppm in that spectrum when TMS is taken as 0 ppm; and using them in the expression $(X/Y) \times 100$.

The methacrylic resin (A) constituting the film according to the present invention has a weight average molecular weight (hereinafter referred to as "Mw") of preferably 50000 to 150000, more preferably 60000 to 120000, even more preferably 65000 to 100000. In a case where an Mw falls within the above ranges, a film can readily be obtained which has a uniform film thickness, and is excellent in surface smoothness, impact resistance and toughness.

The methacrylic resin (A) constituting the film according to the present invention has the ratio (Mw/Mn: hereinafter, this value is referred to as a "molecular weight distribution") of Mw to a number average molecular weight (hereinafter referred to as "Mn") of preferably 1.2 to 2.0, more preferably 1.3 to 1.7. In a case where the molecular weight distribution falls within the above ranges, a film having an excellent surface smoothness, impact resistance and toughness can readily be obtained. Note that Mw and Mn are values in terms of the molecular weight of a polystyrene standard converted from a chromatogram obtained by gel permeation chromatography (GPC).

The methacrylic resin (A) constituting the film according to the present invention has a content of fraction having a molecular weight of not less than 200000 (high molecular weight fraction) of 0.1 to 10%, preferably 0.5 to 5%. Further, the methacrylic resin (A) constituting the film according to the present invention has a content of fraction having a molecular weight of less than 15000 (low molecular weight fraction) of 0.2 to 5%, preferably 1 to 4.5%. Moreover, the sum of the content of fraction having a molecular weight of not less than 200000 (high molecular weight fraction) and the content of fraction having a molecular weight of less than 15000 (low molecular weight fraction) is 0.3 to 10%, more preferably 2 to 6%. In a case where the methacrylic resin contains the high molecular weight fraction and the low molecular weight fraction within the above ranges, the film formability can be improved, and a film having a uniform film thickness can readily be obtained.

The content of fraction having a molecular weight of not less than 200000 is computed by taking a ratio of an area of a region having a retention time shorter than that of a polystyrene standard having a molecular weight of 200000 relative to the total area enclosed by a chromatogram and a baseline determined by GPC. The content of fraction having a molecular weight of less than 15000 is computed by taking a ratio of an area of a region having a retention time longer than that of a polystyrene standard having a molecular weight of 15000 relative to the total area enclosed by a chromatogram and a baseline determined by GPC.

Note that GPC measurements are performed as follows. Tetrahydrofuran is used as an eluent, and a column is used where two TSKgel SuperMultipore HZM-Ms and a SuperHZ4000 from TOSOH Corp. are connected in series. As a detecting unit, used was a TOSOH HLC-8320 (model number) equipped with a differential refractive index detector (RI detector). A solution in which 4 mg of a methacrylic resin was dissolved in 5 ml of tetrahydrofuran was used as a sample solution. The temperature in a column oven was set to 40° C., and 20 μl of the sample solution was then injected at an eluent flow rate of 0.35 ml/min to obtain a chromatogram.

Polystyrene standards having molecular weights in the range between 400 and 5000000 were measured, and a calibration curve was created which showed the relationship between the retention time and the molecular weight. As a base line, taken was a line connecting a point where the slope at the higher molecular weight side of a peak in the chromatogram changes from zero to positive and a point where the slope at the lower molecular weight side of the peak changes from negative to zero. When there are shown two or more peaks in the chromatogram, a line connecting a point where the slope at the highest molecular weight side of the peaks changes from zero to positive and a point where the slope at the lowest molecular weight side of the peaks changes from negative to zero was taken as a baseline.

The methacrylic resin (A) constituting the film according to the present invention has a melt flow rate of preferably not less than 0.1 g/10 minutes, more preferably 0.1 to 30 g/10 minutes, more preferably 0.5 to 20 g/10 minutes, most preferably 1.0 to 10 g/10 minutes as measured under the conditions of 230° C. and a load of 3.8 kg in accordance with JIS K7210.

The methacrylic resin (A) constituting the film according to the present invention comprises a structural unit derived from a methacrylic acid ester in an amount of preferably not less than 90% by mass, more preferably not less than 95% by mass, even more preferably not less than 98% by mass, in particular preferably not less than 99% by mass, most preferably 100% by mass. Examples of the methacrylic acid ester can include methacrylic acid alkyl esters such as methyl methacrylate, ethyl methacrylate, butyl methacrylate and the like; methacrylic acid aryl esters such as phenyl methacrylate and the like; methacrylic acid cycloalkyl esters such as cyclohexyl methacrylate, norbornenyl methacrylate and the like. Among these, methacrylic acid alkyl esters are preferred, and methyl methacrylate is most preferred. Further, the amount of a structural unit derived from methyl methacrylate with respect to the structural units derived from the methacrylic acid esters is more preferably not less than 95% by mass, even more preferably not less than 98% by mass, in particular preferably not less than 99% by mass, most preferably 100% by mass. Moreover, the amount of a structural unit derived from methyl methacrylate comprised in the methacrylic resin (A) constituting the film according to the present invention is preferably not less than 99% by mass, most preferably 100% by mass.

Examples of structural units other than those derived from methacrylic acid esters can include structural units derived from vinyl monomers having only one polymerizable carbon-carbon double bond in one molecule such as acrylic acid alkyl esters such as methyl acrylate, ethyl acrylate, propyl acrylate, butyl acrylate, 2-ethylhexyl acrylate and the like; acrylic acid aryl esters such as phenyl acrylate and the like; acrylic acid cycloalkyl esters such as cyclohexyl acrylate, norbornenyl acrylate and the like; aromatic vinyl compounds such as styrene, α-methyl styrene and the like; acrylamide; methacrylamide; acrylonitrile; methacrylonitrile and the like.

The glass transition temperature of the methacrylic resin (A) constituting the film according to the present invention is preferably not less than 120° C., more preferably not less than 123° C., even more preferably not less than 124° C. The upper limit of the glass transition temperature of the methacrylic resin (A) is usually not more than 130° C. The glass transition temperature can be controlled by adjusting a molecular weight or syndiotacticity (rr). In a case where the glass transition temperature falls in this range, deformation such as thermal shrinkage unlikely occurs in the resulting film. Note that all glass transition temperatures in the present invention are midpoint glass transition temperatures as measured by the method described in Examples.

There is no particular limitation for a method of manufacturing the methacrylic resin (A). For example, a methacrylic resin whose properties such as Mw, a ratio of high molecular weight fraction, a ratio of low molecular weight fraction, syndiotacticity (rr) and the like fall in the ranges specified in the present invention can be manufactured by adjusting a polymerization temperature, a polymerization duration, types and amounts of chain transfer agents, types and amounts of polymerization initiators and the like in the known polymerization methods such as the radical polymerization method and the anionic polymerization method.

For example, in the case of the radical polymerization method, a polymerization temperature is preferably not more than 80° C., more preferably not more than 70° C., even more preferably not more than 60° C. Adjusting of the temperature in this way can easily increase the syndiotacticity (rr). The continuous radical polymerization or the anionic polymerization method in the absence of a solvent is preferred in view of that a methacrylic resin having a high thermal decomposition resistance, less foreign substances and a high transparency can be obtained. Further, the anionic polymerization method is preferred in view of that dimers and trimers of a methacrylic acid ester are less, and the appearance of a formed article is excellent.

In the case of the anionic polymerization method, an alkyllithium such as n-butyllithium, sec-butyllithium, isobutyllithium, tert-butyllithium and the like is preferably used as a polymerization initiator. Further, an organo-aluminum compound is preferably allowed to coexist in view of productivity. As the organo-aluminums, mentioned can be compounds represented by the formula $AlR^1R^2R^3$, wherein $R^1$, $R^2$ and $R^3$ each independently represent an alkyl group having optionally substituent, a cycloalkyl group having optionally substituent, an aryl group having optionally substituent, an aralkyl group having optionally substituent, an alkoxyl group having optionally substituent, an aryloxy group having optionally substituent or N,N-disubstituted amino group. $R^2$ and $R^3$ may join together to form an arylenedioxy group having optionally substituent. Specific examples of organo-aluminums can include isobutylbis(2,6-di-tert-butyl-4-methylphenoxy)aluminum, isobutylbis(2,6-di-tert-butylphenoxy)aluminum, isobutyl[2,2'-methylenebis(4-methyl-6-tert-butylphenoxy)]aluminum and the like.

Further, in the anionic polymerization method, an ether, a nitrogen-containing compound and the like can also be allowed to coexist in order to control a polymerization reaction.

Moreover, in a case where the methacrylic resin (A) is manufactured by the anionic polymerization method, the content of fractions with a molecular weight of not less than 200000, the content of fractions with a molecular weight of less than 15000 and the like can be adjusted to fall in the ranges specified in the present invention by adding a polymerization terminator in the middle of a polymerization reaction in an amount less than that of a polymerization initiator, specifically, in an amount of preferably 1 mol % to 50 mol %, more preferably 2 mol % to 20 mol %, even more preferably 5 mol % to 10 mol % relative to the amount of the polymerization initiator; or further adding a polymerization initiator in the middle of a polymerization reaction in an amount of preferably 1 mol % to 50 mol %, more preferably 2 mol % to 20 mol %, even more preferably 5 mol % to 10 mol % relative to the amount of the polymerization initiator initially added; or the like.

Examples of another method for manufacturing the methacrylic resin (A) can include a method comprising appropriately mixing two or more methacrylic resins in which any of properties such as Mw, a ratio of high molecular weight fractions, a ratio of low molecular weight fractions, or the syndiotacticity fall outside the ranges specified in the present invention to obtain a methacrylic resin in which properties such as Mw, a ratio of high molecular weight fractions, a ratio of low molecular weight fractions, and the syndiotacticity (rr) fall within the ranges specified in the present invention. Process control is easy in the case of the aforementioned method. Mixing of two or more methacrylic resins can be performed by the known methods, for example, using a melt kneading machine such as a kneader-ruder, an extruder, a mixing roll, a Banbury mixer or he like. The temperature at the time of kneading can be appropriately adjusted depending on the melting temperature of a methacrylic resin to be used, and is usually 150° C. to 300° C.

Examples of yet another method for manufacturing the methacrylic resin (A) can include a method comprising polymerizing monomers in the presence of a methacrylic resin in which any of the properties fall outside the ranges specified in the present invention to obtain a methacrylic resin in which the properties such as Mw, a ratio of high molecular weight fractions, a ratio of low molecular weight fractions, the syndiotacticity (rr) fall in the ranges specified in the present invention. The aforementioned polymerization can be performed as in the radical polymerization method or the anionic polymerization method as described above. In the case of the manufacturing method in which monomers are polymerized in the presence of an off-specification methacrylic resin, the heat history of the methacrylic resin is shorter than that in the case of the manufacturing method in which two or more methacrylic resins are mixed. Therefore, the thermal decomposition of the methacrylic resin may be suppressed, and a film having less coloring and less foreign substances can be easily obtained.

Among these methods for manufacturing the methacrylic resin (A), the followings are preferred in view of that the methacrylic resin (A) having a high transparency and a high thermal decomposition resistance can easily be manufactured: a method for manufacturing the methacrylic resin (A) with the properties satisfying the specified ranges by the anionic polymerization method; a method for manufacturing the methacrylic resin (A) with the properties satisfying the specified ranges, comprising mixing a methacrylic resin (I) manufactured by the anionic polymerization method with a methacrylic resin (II) manufactured by the radical polymerization method; and a method for manufacturing the methacrylic resin (A) with the properties satisfying the specified ranges, comprising mixing a methacrylic resin (I') manufactured by the anionic polymerization method with a methacrylic resin (I") manufactured by another anionic polymerization method. More preferred is a method for manufacturing the methacrylic resin (A) with the properties satisfying the specified ranges, comprising mixing a methacrylic resin (I) manufactured by the anionic polymerization method with a methacrylic resin (II) manufactured by the radical polymerization method.

The film according to the present invention may contain various types of additives if desired, for example, an antioxidant, a stabilizer, an ultraviolet absorber, a lubricant, a processing aid, an antistatic agent, a colorant, a fluorescent whitening agent, an impact resistant aid, a foaming agent, a filler, light diffusing fine particles, a delustering agent and the like in addition to the methacrylic resin (A). A resin composition comprising the methacrylic resin (A) or the methacrylic resin (A) and the above additives can be formed into a pellet and the like in order to improve the convenience at the time of storage, transportation or forming.

The amount of the methacrylic resin (A) contained in the film according to one embodiment of the present invention is preferably not less than 80% by mass, more preferably not less than 85% by mass, even more preferably not less than 90% by mass, in particular preferably not less than 95% by mass relative to the mass of the film.

The film according to the present invention may contain other polymers, if desired, in a range where the effects of the present invention are not impaired. Examples of other polymers can include polyolefin resins such as polyethylene, polypropylene, polybutene-1, poly-4-methylpentene-1, polynorbornene; ethylene ionomers; styrene resins such as polystyrene, styrene-maleic anhydride copolymer, high impact polystyrene, AS resin, ABS resin, AES resin, AAS resin, ACS resin, MBS resin; methyl methacrylate polymer, methyl methacrylate-styrene copolymer; polyester resins such as polyethylene terephthalate, polybutylene terephthalate; polyamides such as Nylon 6, Nylon 66, polyamide elastomers; polycarbonate, polyvinyl chloride, polyvinylidene chloride, polyvinyl alcohol, polyvinyl butyral, polyvinyl acetal, ethylene-vinyl alcohol copolymer, polyacetal, polyvinylidene fluoride, polyurethane, modified polyphenylene ether, polyphenylene sulfide, silicone modified resins; acrylic rubbers, acrylic thermoplastic elastomers, silicone rubbers; styrene thermoplastic elastomers such as SEPS, SEBS, SIS; olefin rubbers such as IR, EPR, EPDM and the like. These polymers may be used alone or in combination of two or more.

The amounts of these other polymers which may be contained in the film according to the present invention are preferably not more than 10% by mass, more preferably not more than 5% by mass, most preferably not more than 0% by mass relative to the mass of the film.

The film according to another embodiment of the present invention comprises a methacrylic resin composition comprising a polycarbonate resin or a polyester resin and the methacrylic resin (A). In the case of the above film, the phase difference of the film can be easily controlled to a desired value. The amount of the polycarbonate resin or the polyester resin is preferably 1 to 10 parts by mass, more preferably 2 to 7 parts by mass, even more preferably 3 to 6 parts by mass relative to 100 parts by mass of the methacrylic resin (A).

The film according to another embodiment of the present invention comprises a methacrylic resin composition comprising a polycarbonate resin and the methacrylic resin (A). An aromatic polycarbonate resin is preferred in view of that a film having an excellent transparency can be easily obtained. A polycarbonate resin is a polymer obtained by reacting a polyfunctional hydroxy compound with a carbonate-forming compound.

An aromatic polycarbonate resin used in the present invention is not particularly limited by the manufacturing methods thereof. For example, the phosgene method (interfacial polymerization), the melt polymerization method (transesterification method) and the like can be mentioned. Further, an aromatic polycarbonate resin preferably used in the present invention may be a polycarbonate resin manufactured by the melt polymerization method subjected to a treatment for adjusting the amount of terminal hydroxy groups.

Examples of a polyfunctional hydroxy compound which is a raw material for manufacturing a polycarbonate resin can include optionally substituted 4,4'-dihydroxybiphenyls; optionally substituted bis(hydroxyphenyl)alkanes; optionally substituted bis(4-hydroxyphenyl)ethers; optionally substituted bis(4-hydroxyphenyl)sulfides; optionally substituted bis(4-hydroxyphenyl)sulfoxides; optionally substituted bis(4-hydroxyphenyl)sulfones; optionally substituted bis(4-hydroxyphenyl)ketones; optionally substituted bis(hydroxyphenyl)fluorenes; optionally substituted dihydroxy-p-terphenyls; optionally substituted dihydroxy-p-quarterphenyls; optionally substituted bis(hydroxyphenyl)pyrazines; optionally substituted bis(hydroxyphenyl)menthanes; optionally substituted bis[2-(4-hydroxyphenyl)-2-propyl]benzens; optionally substituted dihydroxynaphthalenes; optionally substituted dihydroxybenzens; optionally substituted polysiloxanes; optionally substituted dihydroperfluoroalkanes; and the like.

Among these polyfunctional hydroxy compounds, preferred are 2,2-bis(4-hydroxyphenyl)propane, 1,1-bis(4-hydroxyphenyl)cyclohexane, bis(4-hydroxyphenyl)diphenylmethane, 1,1-bis(4-hydroxyphenyl)-1-phenylethane, 2,2-bis(4-hydroxy-3-methylphenyl)propane, 2,2-bis(4-hydroxy-3-phenylphenyl)propane, 4,4'-dihydroxybiphenyl, bis(4-hydroxyphenyl)sulfone, 2,2-bis(3,5-dibromo-4-hydroxyphenyl)propane, 3,3-bis(4-hydroxyphenyl)pentane, 9,9-bis(4-hydroxy-3-methylphenyl)fluorene, bis(4-hydroxyphenyl)ether, 4,4'-dihydroxybenzophenone, 2,2-bis(4-hydroxy-3-methoxypheny)1,1,1,3,3,3-hexafluoropropane, α,ω-bis[3-(2-hydroxyphenyl)propyl]polydimethylsiloxane, resorcin, and 2,7-dihydroxynaphthalene. In particular, 2,2-bis(4-hydroxyphenyl)propane is preferred.

Examples of a carbonate-forming compound can include various dihalogenated carbonyls such as phosgene and the like, haloformates such as chloroformate and the like, and carbonate compounds such as bisaryl carbonate and the like. The amount of the carbonate-forming compound may be appropriately adjusted in consideration of the stoichiometry ratio (equivalence) of a reaction with a polyfunctional hydroxy compound.

A polymerization reaction is usually performed in a solvent in the presence of an acid binding agent. Examples of an acid binding agent can include alkali metal hydroxides such as sodium hydroxide, potassium hydroxide, lithium hydroxide, and cesium hydroxide; alkali metal carbonates such as sodium carbonate, potassium carbonate and the like;

tertiary amines such as trimethylamine, triethylamine, tributylamine, N,N-dimethylcyclohexylamine, pyridine, dimethylaniline and the like; quaternary ammonium salts such as trimethylbenzylammonium chloride, triethylbenzylammonium chloride, tributylbenzylammonium chloride, trioctylmethylammonium chloride, tetrabuthylammonium chloride, tetrabutylammonium bromide and the like; quaternary phosphonium salts such as tetrabuthylphosphonium chloride, tetrabuthylphosphonium bromide; and the like. Further, a small amount of an antioxidant such as sodium sulfite, hydrosulfide or the like may be added to this reaction system, if desired. The amount of an acid biding agent may be appropriately adjusted in consideration of the stoichiometry ratio (equivalence) of the reaction. Specifically, an acid binding agent may be used in 1 equivalence or excess, preferably 1 to 5 equivalence per mole of a hydroxyl group of a polyfunctional hydroxy compound as a raw material.

Further, a known chain-end terminator and branching agent can be used for the reaction. Examples of chain-end terminators can include p-tert-butyl-phenol, p-phenylphenol, p-cumylphenol, p-perfluorononylphenol, p-(perfluorononylphenyl)phenol, p-(perfluoroxylphenyl)phenol, p-tert-perfluorobutylphenol, 1-(P-hydroxybenzyl)perfluorodecane, p-[2-(1H,1H-perfluorotridodecyloxy)-1,1,1,3,3,3-hexafluoropropyl]phenol, 3,5-bis(perfluorohexyloxycarbonyl)phenol, perfluorododecyl p-hydroxybenzoate, p-(1H,1H-perfluorooctyloxy)phenol, 2H,2H,9H-perfluorononanoic acid, 1,1,1,3,3,3-tetrafluoro-2-propanol; and the like.

Examples of branching agents can include fluoroglycine, pyrogallol, 4,6-dimethyl-2,4,6-tris(4-hydroxyphenyl)-2-heptene, 2,6-dimethyl-2,4,6-tris(4-hydroxyphenyl)-3-heptene, 2,4-dimethyl-2,4,6-tris(4-hydroxyphenyl)heptane, 1,3,5-tris(2-hydroxyphenyl)benzene, 1,3,5-tris(4-hydroxyphenyl)benzene, 1,1,1-tris(4-hydroxyphenyl)ethane, tris(4-hydroxyphenyl)phenylmethane, 2,2-bis[4,4-bis(4-hydroxyphenyl)cyclohexyl]propane, 2,4-bis[2-bis(4-hydroxyphenyl)-2-propyl]phenol, 2,6-bis(2-hydroxy-5-methylbenzyl)-4-methylphenol, 2-(4-hydroxyphenyl)-2-(2,4-dihydroxyphenyl)propane, tetrakis(4-hydroxyphenyl)methane, tetrakis[4-(4-hydroxyphenylisopropyl)phenoxy]methane, 2,4-dihydroxybenzoic acid, trimesic acid, cyanuric acid, 3,3-bis(3-methyl-4-hydroxyphenyl)-2-oxo-2,3-dihydroindole, 3,3-bis(4-hydroxyaryl)oxyindole, 5-chloroisatin, 5,7-dichloroisatin, 5-bromoisatin and the like.

A polycarbonate resin may comprise a unit having a polyester, polyurethane, polyether or polysiloxane structure in addition to a polycarbonate unit.

In view of that phase difference can easily be controlled to a desired value, and a film having an excellent transparency can be obtained, preferably used is a polycarbonate resin having an MVR value at 300° C. and 1.2 kg of 1 to 100,000 cm$^3$/10 min, preferably 80 to 400 cm$^3$/10 min, more preferably 100 to 300 cm$^3$/10 min, even more preferably 130 to 250 cm$^3$/10 min, most preferably 150 to 230 cm$^3$/10 min, or a polycarbonate resin having a weight average molecular weight of 5000 to 75000, preferably 13000 to 32000, more preferably 14000 to 30000, even more preferably 15000 to 28000, most preferably 18000 to 27000, the weight average molecular weight being obtained by converting a chromatogram measured by gel permeation chromatography (GPC) into the equivalent molecular weight of a polystyrene standard. The MVR value and the molecular weight of a polycarbonate resin can be adjusted by adjusting the amount of a chain-end terminator and/or a branching agent.

A polycarbonate resin used in the present invention may contain various types of additives if desired, for example, an antioxidant, a stabilizer, an ultraviolet absorber, a lubricant, a processing aid, an antistatic agent, a colorant, a fluorescent whitening agent, an impact resistant aid, a foaming agent, a filler, light diffusing fine particles, a delustering agent and the like. A polycarbonate resin which may contain the aforementioned additives and the like, if desired, can be formed into a shape such as a pellet in order to improve the convenience at the time of storage, transportation or forming.

A methacrylic resin composition comprising the methacrylic resin (A) and a polycarbonate resin, for constituting the film according to the present invention, is not limited by the preparing methods thereof. For example, mentioned can be a method in which a monomer mixture comprising methyl methacrylate is polymerized in the presence of various additives and a polycarbonate resin to produce the methacrylic resin (A), a method in which the methacrylic resin (A) and a polycarbonate resin are melt-kneaded or the like. Among these, the melt kneading method is preferred in view of simple steps thereof. Kneading can be performed with a known mixing machine or kneading machine such as a kneader ruder, an extruder, a mixing roll, a Banbury mixer, for example. Among these, a twin screw extruder is preferred. The temperature at the time of mixing/kneading can be appropriately adjusted depending on the softening temperature and the like of the methacrylic resin (A) and a polycarbonate resin to be used, but it is preferably 110° C. to 300° C. Further, a shear rate at the time of kneading can be adjusted within the range of 10 to 5000 sec$^{-1}$. Moreover, in a case where the methacrylic resin (A) is melt-kneaded with a polycarbonate resin, melt-kneading is preferably performed under the conditions where the relative viscosity ($\eta_B/\eta_A$) of the melt viscosity ($\eta_A$) of the methacrylic resin (A) and the melt viscosity ($\eta_B$) of the polycarbonate resin is not more than 1.0.

A methacrylic resin composition prepared by the methods described above can be formed into any forms such as a pellet, granule, powder, and then can be formed into a film.

The film according to the present invention may contain a filler if desired in a range where the effect of the present invention is not impaired. Examples of a filler can include calcium carbonate, talc, carbon black, titanium oxide, silica, clay, barium sulfate, magnesium carbonate and the like. The amount of a filler which may be contained in the film according to the present invention is preferably not more than 3% by mass, more preferably not more than 1.5% by mass.

The film according to the present invention may contain, if desired, additives such as an antioxidant, a thermal deterioration inhibitor, an ultraviolet absorber, an infrared absorber, a light stabilizer, a lubricant, a parting agent, a polymer processing aid, an antistatic agent, a flame retardant, dyes and pigments, a light-diffusing agent, an organic dye, a delustering agent, an impact resistance modifier and a fluorescent substance in addition to a filler.

An antioxidant alone has an effect for preventing oxidation deterioration of a resin in the presence of oxygen. For example, a phosphorus antioxidizing agent, a hindered phenol antioxidizing agent, a thioether antioxidizing agent and the like can be mentioned. Among these, a phosphorus antioxidizing agent and a hindered phenol antioxidizing agent are preferred in view of the effect for preventing deterioration of an optical property due to coloring. More preferably, a phosphorus antioxidizing agent and a hindered phenol antioxidizing agent are used in combination.

In a case where a phosphorus antioxidizing agent and a hindered phenol antioxidizing agent are used in combination, a phosphorus antioxidizing agent/hindered phenol antioxidizing agent are preferably used in a mass ratio of 0.2/1 to 2/1, and more preferably used in 0.5/1 to 1/1.

As a phosphorus antioxidizing agent, preferred are 2,2-methylenebis(4,6-di-t-butylphenyl)octylphosphite (ADEKA Corp.; product name: ADK STAB HP-10), tris(2,4-di-t-butylphenyl)phosphite (BASF A.G.; product name: IRGAFOS168), 3,9-bis(2,6-di-tert-butyl-4-methylphenoxy)-2,4,8,10-tetraoxa-3,9-diphosphaspiro[5.5]undecane (ADEKA Corp: product name: ADK STAB PEP-36) and the like.

As a hindered phenol antioxidizing agent, preferred are pentaerythrityl-tetrakis[3-(3,5-di-t-butyl-4-hydroxy phenyl) propionate] (BASF A.G.; product name: IRGANOX1010), octadecyl-3-(3,5-di-t-butyl-4-hydroxyphenyl)propiona to (BASF A.G.; product name: IRGANOX1076) and the like.

A thermal deterioration inhibitor can prevent thermal deterioration of a resin by capturing a polymer radical generated when exposed to high temperature in the substantially absence of oxygen.

As the above thermal deterioration inhibitor, preferred are 2-t-butyl-6-(3'-t-butyl-5'-methyl-hydroxybenzyl)-4-m ethylphenylacrylate (Sumitomo Chemical Co., Ltd.; product name: Sumilizer GM), 2,4-di-t-amyl-6-(3',5'-di-t-amyl-2'-hydroxy-α-methyl benzyl)phenylacrylate (Sumitomo Chemical Co., Ltd.; product name: Sumilizer GS) and the like.

An ultraviolet absorber is a compound capable of absorbing ultraviolet light. An ultraviolet absorber is a compound which is said to have a function for mainly converting light energy into thermal energy.

Examples of an ultraviolet absorber can include benzophenones, benzotriazols, triazines, benzoates, salicylates, cyanoacrylates, oxalic anilides, malonic esters, formamidines and the like. Among these, preferred are benzotriazols, triazines or an ultraviolet absorber being not more than 1200 $dm^3 \cdot mol^{-1}$ $cm^{-1}$ in the maximum molar extinction coefficient $\epsilon_{max}$ in the wavelengths of 380 to 450 nm.

Benzotriazols, which show a strong effect for preventing optical property deterioration such as coloring due to exposure to ultraviolet light, are preferred as an ultraviolet absorber when the film according to the present invention is used for optical use. As benzotriazols, preferred are 2-(2H-benzotriazol-2-yl)-4-(1,1,3,3-tetramethylbutyl)phenol (BASF A.G.; product name: TINUVIN329), 2-(2H-benzotriazol-2-yl)-4,6-bis(1-methyl-1-phenylethyl)phenol (BASF A.G.; product name TINUVIN234), 2,2'-methylenebis[6-(2H-benzotriazol-2-yl)-4-tert-octylphenol] (ADEKA Corp.; LA-31) and the like.

Further, an ultraviolet absorber in which the maximum molar extinction coefficient $\epsilon_{max}$ in the wavelengths of 380 to 450 nm is not more than 1200 $dm^3 \cdot mol^{-1}$ $cm^{-1}$ can prevent color change of the resulting film. Examples of such an ultraviolet absorber may include 2-ethyl-2'-ethoxy-oxalanilide (Clariant Japan K.K.; product name: Sanduvor VSU) and the like.

Among these ultraviolet absorbers, benzotriazols are preferably used in view of that deterioration of a resin due to exposure to ultraviolet light can be prevented.

Further, triazine ultraviolet absorbers are preferably used to efficiently absorb a light with a wavelength around a wavelength of 380 nm. Examples of such an ultraviolet absorber can include 2,4,6-tris(2-hydroxy-4-hexyloxy-3-methylphenyl)-1,3,5-triazine (ADEKA Corp.; LA-F70), analogs thereof such as hydroxyphenyl triazine ultraviolet absorbers (BASF A.G.; TINUVIN477 or TINUVIN460) and the like.

Note that the maximum molar extinction coefficient $\epsilon_{max}$ of an ultraviolet absorber is measured as follows. An ultraviolet absorber in an amount of 10.00 mg is added to 1 L of cyclohexane, and allowed to dissolve until no undissolved materials are visually observed. This solution is transferred into a 1 cm×1 cm×3 cm quartz glass cell, and the absorbance in the wavelengths of 380 to 450 nm is measured with a Hitachi U-3410 spectrophotometer. The maximum molar extinction coefficient $\epsilon_{max}$ is computed by the following expression using the molecular weight ($M_{UV}$) of an ultraviolet absorber and the maximum value ($A_{max}$) of the measured absorbance.

$$\epsilon_{max} = [A_{max}/(10 \times 10^{-3})] \times M_{UV}$$

A light stabilizer is a compound which is said to have a function for capturing a radical generated by mainly light oxidation. Examples of a suitable light stabilizer can include hindered amines such as a compound having a 2,2,6,6-tetraalkylpiperidine backbone.

Examples of a lubricant can include stearic acid, behenic acid, stearoamide acid, methylenebis stearoamide, hydroxystearic acid triglyceride, paraffin wax, ketone wax, octyl alcohol, hardened oil and the like.

A parting agent is a compound having a function for facilitating release of a molded article from a mold. Examples of a parting agent can include higher alcohols such as cetyl alcohol, stearyl alcohol and the like; glycerin higher fatty acid esters such stearic acid monoglyceride, stearic acid diglyceride and the like. In the present invention, higher alcohols and glycerin fatty acid monoesters are preferably used in combination. In a case where higher alcohols and glycerin fatty acid monoesters are used in combination, the mass ratio of higher alcohols/glycerin fatty acid monoesters is preferably in the range of 2.5/1 to 3.5/1, more preferably in the range of 2.8/1 to 3.2/1.

A polymer processing aid usually comprises polymer particles having a particle diameter of 0.05 to 0.5 μm which can be manufactured by the emulsion polymerization method. These polymer particles may be monolayer particles comprising a polymer of a single composition ratio and single limiting viscosity, or may be multilayer particles comprising two or more polymers having different composition ratios or limiting viscosities. Among these, two-layered particles having an inner layer comprising a polymer with a low limiting viscosity and an outer layer comprising a polymer with a high limiting viscosity of not less than 5 dl/g are preferably mentioned. A polymer processing aid preferably has a limiting viscosity of 3 to 6 dl/g. Examples of a polymer processing aid can include the Metablen series produced by Mitsubishi Rayon Co., Ltd., a product from Rohm & Hass Co., a product from Dow Chemical Company, the Paraloid series produced by Kureha Chemical Industry Co., Ltd. and the like. The amount of a polymer processing aid contained in the film according to the present invention is preferably not less than 0.1 part by mass and not more than 5 parts by mass relative to the acrylic resin. The amount of not more than 0.1 part by mass will not provide good processing properties, and the amount of not less than 5 parts by mass will cause problems such as decreased surface properties.

Examples of an impact resistance modifier can include a core-shell modifier comprising a core layer component containing acrylic rubber or diene rubber; a modifier containing two or more rubber particles; and the like.

As an organic dye, preferably used is a compound having a function for converting ultraviolet light considered harmful to resins into visible light.

Examples of a light diffusing agent and a delustering agent can include glass fine particles, cross-linked polysiloxane fine particles, cross-linked polymer fine particles, talc, calcium carbonate, barium sulfate and the like.

Examples of a fluorescent substance can include a fluorescent pigment, a fluorescent dye, a fluorescent white dye, a fluorescent whitening agent, a fluorescent bleaching agent and the like.

These additives may be used alone or in combination of two or more. Further, these additives may be added to a polymerization reaction solution when manufacturing a methacrylic resin, may be added to a methacrylic resin and other polymers manufactured, or may be added when forming a film. The total amount of these additives is preferably not more than 7 parts by mass, more preferably not more than 5 parts by mass, even more preferably not more than 4 parts by mass relative to 100 parts by mass of the methacrylic resin (A) in order to prevent poor film appearance.

The film according to the present invention can be film-formed of the methacrylic resin (A) or a methacrylic resin composition by a known film-forming method, for example, the solution casting method, the melt casting method, the extrusion method, the inflation forming method, the blow forming method and the like. Among these, the extrusion method is preferred. According to the extrusion method, a film having a high transparency, a uniform thickness and an excellent surface smoothness can be obtained in relatively high productivity. The temperature of the methacrylic resin (A) or a methacrylic resin composition discharged from an extruder is set to preferably 200 to 300° C., more preferably 230 to 270° C. The extruder preferably has an apparatus capable of removing impurities in the extruder thorough a bent and a polymer filter in view of removing foreign substances. Moreover, a gear pump may be installed in order to achieve high thickness precision for the film manufacture.

Among the extrusion methods, preferred is a method comprising extruding the methacrylic resin (A) or a methacrylic resin composition in a molten state through a T die, and then sandwiching it between two or more mirrored rolls or mirrored belts, in view of that a film with a good surface smoothness, a good specular gloss and a low haze can be obtained. Mirrored rolls or mirrored belts are preferably made of a chromeplated metal.

Further, the surface temperature of mirrored rolls or mirrored belts is preferably within 15° C. above and within 40° C. below, more preferably within 5° C. above and within 30° C. below the glass transition temperature of a methacrylic resin. Detachment marks from a roll become significant in the case of not less than 15 above the glass transition temperature of a methacrylic resin while thermal shrinkage of a film becomes large in the case of not less than 40° C. below the glass transition temperature of a methacrylic resin.

Stretching treatment may be performed to a film formed of the methacrylic resin (A) or a methacrylic resin composition. Stretching treatment can enhance mechanical strength of the film, and a film more resistant to cracking can be obtained. There is no particular limitation for the stretching methods, but they can include the monoaxial stretching method, the simultaneous biaxial stretching method, the sequential biaxial stretching method, the tubular stretching method and the like. The lower limit of a stretching temperature is 10° C. higher than the glass transition temperature of the methacrylic resin (A) while the upper limit thereof is 40° C. higher than the glass transition temperature of the methacrylic resin (A) in view of that uniform stretching can be achieved, and a film with high strength can be obtained. Stretching is commonly performed at 100 to 5000%/min based on length. A film with less thermal shrinkage can be obtained by performing heat setting after stretching.

The thickness of the film according to the present invention is preferably 10 to 200 μm.

The film according to the present invention has a haze, in the thickness of 100 μm, of preferably not more than 0.5%, more preferably not more than 0.3%. Thereby, a film having excellent surface gloss and transparency can be obtained. Further, it is preferred in view of enhanced usage efficiency of a light source when used for optical uses such as liquid crystal protective films, light guide films or the like. Furthermore, it is preferred in view of excellent shaping precision when performing surface shaping.

The film according to the present invention can be used for various uses. For example, the film according to the present invention can be applied to various uses when a functional layer is provided on its surface. Examples of a functional layer can include a hard-coat layer, an anti-glare layer, an antireflective layer, an anti-sticking layer, a diffusion layer, a glare-proof layer, an antistatic layer, a antifouling layer, a slipping layer of fine particles and the like.

Further, the film according to the present invention can be applied to various uses when an adhesive layer is provided on its surface. As an adhesive in an adhesive layer, for example, an aqueous adhesive, a solvent adhesive, a hot melt adhesive, an active energy ray-curable adhesive and the like can be used. Among these, an aqueous adhesive and an active energy ray-curable adhesive are suitable.

Examples of an aqueous adhesive can include, but not particularly limited to, vinyl polymer adhesives, gelatin adhesives, vinyl latex adhesives, polyurethane adhesive, isocyanate adhesives, polyester adhesives, epoxy adhesives and the like. To these aqueous adhesives, cross linking agents and other additives, catalysts such as acid can also be blended if desired. As the aqueous adhesive, an adhesive comprising a vinyl polymer is preferably used, and as the vinyl polymer, a polyvinyl alcohol resin is preferred. Further, a water-soluble cross-linking agent such as boric acid, borax, glutaraldehyde, melamine and oxalic acid may be contained in a polyvinyl alcohol resin. In particular, in a case where a polyvinyl alcohol polymer film is used as a polarizer, an adhesive comprising a polyvinyl alcohol resin is preferably used in view of adhesiveness. Further, an adhesive comprising a polyvinyl alcohol resin having an acetoacetyl group is more preferably used in view of improved durability. The above aqueous adhesive is usually used in a state of an aqueous solution, and usually contains 0.5 to 60% by weight of solid contents.

For an active energy ray-curable adhesive, a compound having at least one (meth)acryloyl group or a compound having at least one vinyl group can be used as a curable component, and other than that, a photocationic curable component mainly comprising an epoxy compound and/or an oxetane compound and a photo acid-generating agent can also be used.

As active energy ray, electron ray or ultraviolet light can be used.

The film according to the present invention has a high transparency and thermal resistance, and thus is suitable for use in a polarizer protective film, a liquid crystal protective plate, a surface material for mobile information terminals, a display window protective film for mobile information terminals, a light guide film, a transparent electric conductive film with silver nanowires or carbon nanotubes applied on a surface thereof, a front panel for various displays and the like. In particular, the film according to the present invention comprising a methacrylic resin composition comprising the methacrylic resin (A) and a polycarbonate resin can provide desired phase difference, and thus is suitable for optical use in polarizer protective films, phase difference films and the like.

The film according to the present invention has a high transparency and thermal resistance, and thus can be used for an IR cut film, a security film, a shatterproof film, a decoration film, a metal decoration film, a back sheet for solar cells, a front sheet for flexible solar cells, a shrink film, a film for in-mold labels.

In a case where the film according to the present invention is used for a polarizer protective film or a phase difference film, only one side of the polarizer film may be laminated, or both sides thereof may be laminated. When laminated on a polarizer film, lamination may be performed through an adhesive layer or an adherent layer. A stretched film comprising a polyvinyl alcohol resin and iodine can be used for a polarizer film, and has a film thickness of 1 μm to 100 μm.

EXAMPLES

Below, the present invention will be described with reference to Examples and Comparative Examples. However, the present invention shall not be limited to the following Examples. Note that values for physical properties and the like were measured by the following methods.
(Polymerization Conversion Ratio)

An Inert CAP 1 (df=0.4 μm, 0.25 mm I.D.×60 m) from GL Sciences Inc. was connected as a column to a Shimadzu gas chromatography system GC-14A, and measurements were performed under the following conditions: the injection temperature was 180° C.; the detector temperature was 180° C.; the column temperature was increased from 60° C. (a holding time of 5 min.) to 200° C. at a temperature increasing rate of 10° C./min and then held for 10 min. The polymerization conversion ratio was computed based on these results.
(Mw, Molecular Weight Distribution, Contents of High Molecular Weight Fractions and Low Molecular Weight Fractions)

The Mw and the molecular weight distribution of a methacrylic resin obtained from each of Manufacturing Examples, Examples and Comparative Examples were computed as a value in terms of the molecular weight of a polystyrene standard by determining a chromatogram by the gel permeation chromatography (GPC) under the following conditions. As the baseline, taken was a line connecting a point where the slope at the higher molecular weight side of a peak in a GPC chart changed from zero to positive viewed from the side of a shorter retention time and a point where the slope at the lower molecular weight side of the peak changed from negative to zero viewed from the side of a shorter retention time. The ratio of fractions with a molecular weight of less than 15000 (low molecular weight fractions) and the ratio of fractions with a molecular weight of not less than 200000 (high molecular weight fractions) were computed from an integrated molecular weight distribution computed using a calibration curve.
GPC system: a TOSOH HLC-8320
Detector: a differential refractive index detector
Columns: Two TOSOH TSKgel SuperMultipore HZM-M connected to a SuperHZ4000 in series were used.
Eluent: tetrahydrofuran
Eluent flow rate: 0.35 ml/min.
Column temperature: 40° C.

Calibration curve: created from 10 data points of 10 polystyrene standards.
(Triad Syndiotacticity (rr))

Using a nuclear magnetic resonance system (Bruker ULTRA SHIELD 400 PLUS), a $^1$H-NMR spectrum of a methacrylic resin was measured in deuterated chloroform as a solvent under the conditions of room temperature and 64 times of integration. In that spectrum when TMS is taken as 0 ppm, an area (X) of the 0.6-0.95 ppm region and an area (Y) of the 0.6-1.35 ppm region were measured, and then the triad syndiotacticity (rr) was computed using the formula: (X/Y)×100.
(Glass Transition Temperature)

Using a differential scanning calorimeter (Shimadzu Corporation, DSC-50 (model number)), in accordance with JIS K7121, a methacrylic resin was once heated to 230° C. and then cooled to room temperature. Subsequently, a DSC curve was measured under the conditions where heating was performed from room temperature to 230° C. at 10° C./min. The midpoint glass transition temperature obtained from the DSC curve measured during the second heating was taken as the glass transition temperature in the present invention.
(Melt Flow Rate (MFR))

A methacrylic resin used for manufacture of a film in each of Examples and Comparative Examples was measured in accordance with JIS K7210 under the conditions of 230° C., a load of 3.8 kg and for 10 minutes.
(Thermal Decomposition Resistance)

Thermogravimetric loss was measured for a methacrylic resin using a thermogravimetric system (Shimadzu Corporation, TGA-50 (model number)) under the conditions where heating was performed from 200° C. to 600° C. at 10° C./min under an air atmosphere. The temperature $T_{d1}$ at which the weight was decreased by 1% relative to the weight at 200° C. was computed, and thermal decomposition properties were evaluated in accordance with the following criteria.
  A: $T_{d1}$ is not less than 318° C.
  B: $T_{d1}$ is less than 318° C.
(Variation in Thickness)

The minimum thickness $D_{min}$ [mm] and the maximum thickness $D_{max}$ [mm] of an unstretched film obtained from each of Examples and Comparative Examples were measured, and the variation in thickness was computed using the following expression.

$$\text{Variation in film thickness (\%)} = \{(D_{max}-D_{min})/D_{min}\} \times 100$$

The variation in thickness was evaluated by the following criteria.
  A: The variation in thickness is less than 5%.
  B: The variation in thickness is not less than 5% and not more than 20%.
  C: The variation in thickness is more than 20%.
(Surface Smoothness)

The surface of an unstretched film obtained from each of Examples and Comparative Examples was visually observed, and surface smoothness was evaluated by the following criteria.
  A: The surface is smooth.
  B: The surface is uneven.
(Thermal Shrinkage Ratio)

A straight line with a length of 70 mm was drawn on the surface of an uniaxially stretched film obtained from each of Examples and Comparative Examples, and heated for 30 minutes in a forced air circulation thermostat oven maintained at a temperature of 110° C. Then the length (L (mm))

of the drawn straight line was read on a scale, and the thermal shrinkage ratio was calculated using the following expression.

Thermal shrinkage ratio (%)=(70−L)/70×100

(Total Light Transmittance)

In accordance with JIS K7361-1, the total light transmittance of a biaxially stretched film obtained from each of Examples and Comparative Examples was measured with a haze meter (Murakami Color Research Laboratory Co., Ltd., HM-150).

(Haze)

In accordance with JIS K7136, the haze of a biaxially stretched film obtained from each of Examples and Comparative Examples was measured with a haze meter (Murakami Color Research Laboratory Co., Ltd., HM-150).

(Yellow Index)

A biaxially stretched film obtained from each of Examples and Comparative Examples was subjected to measurement in a light path length of 40 μm with a colorimetric color-difference meter (Nippon Denshoku Industries Co., Ltd, ZE-2000) in accordance with JIS Z8722. A yellow index (YI) of less than 1.0 was evaluated as A while a yellow index of not less than 1.0 was evaluated as B.

(Phase Difference (Rth) in the Direction of Film Thickness)

A test piece (40 mm×40 mm) was cut out from a biaxially stretched film obtained from each of Examples and Comparative Examples. For the test piece, using an automatic birefringence meter (Oji Scientific Instruments, KOBRA-WR), three-dimensional refractive indexes, nx, ny, and nz were obtained from a phase difference value at a temperature of 23±2° C., a humidity of 50±5%, a wavelength of 590 nm and in the direction of 40° inclination to calculate a phase difference in the thickness direction Rth=((nx+ny)/2−nz)×d. The thickness d of the test piece was measured with a digimatic indicator (Mitutoyo Corporation), and the refractive index n was measured with a digital precision refractometer (Kalnew Optical Industrial Co., Ltd. KPR-20).

Preparation Example 1

A 5-L glass reaction vessel equipped with a stirrer blade and a three-way stop cock was purged with nitrogen.

Into this, charged under room temperature were 1600 g of toluene, 3.19 g (13.9 mmol) of 1,1,4,7,10,10-hexamethyl-triethylenetetramine, 68.6 g (39.6 mmol) of a 0.45 M toluene solution of isobutylbis(2,6-di-t-butyl-4-methylphenoxy)aluminum and 7.91 g (13.2 mmol) of a 1.3 M solution (solvent: 95% by mass of cyclohexane and 5% by mass of n-hexane) of sec-butyllithium. To this, 550 g of distillated methyl methacrylate was added dropwise at 20° C. with stirring over 30 minutes. After the completion of dropwise addition, it was stirred at 20° C. for 90 minutes. The color of the solution changed from yellow to clear. The polymerization conversion ratio of methyl methacrylate was 100% at this time.

To the resulting solution, 1500 g of toluene was added for dilution. Subsequently, the above diluted solution was poured into 100 kg of methanol to obtain a precipitate. The precipitate obtained was dried at 80° C., 140 Pa for 24 hours to obtain a methacrylic resin [1] having a Mw of 58900, a molecular weight distribution of 1.06, a syndiotacticity (rr) of 74%, a glass transition temperature of 130° C. and the content of a structural unit derived from methyl methacrylate of 100% by mass.

Preparation Example 2

A 5-L glass reaction vessel equipped with a stirrer blade and a three-way stop cock was purged with nitrogen. Into this, charged under room temperature was 1600 g toluene, 2.49 g (10.8 mmol) of 1,1,4,7,10,10-hexamethyltriethyl-enetetramine, 53.5 g (30.9 mmol) of a 0.45 M toluene solution of isobutylbis(2,6-di-t-butyl-4-methylphenoxy)aluminum and 6.17 g (10.3 mmol) of a 1.3M solution (solvent: 95% of cyclohexane and 5% of n-hexane) of sec-butyl-lithium. To this, 550 g of distillated methyl methacrylate was added dropwise at 20° C. with stirring over 30 minutes. After the completion of dropwise addition, it was stirred at 20° C. for 90 minutes. The color of the solution changed from yellow to clear. The polymerization conversion ratio of methyl methacrylate was 100% at this time.

To the resulting solution, 1500 g of toluene was added for dilution. Subsequently, the above diluted solution was poured into 100 kg of methanol to obtain a precipitate. The precipitate obtained was dried at 80° C., 140 Pa for 24 hours to obtain a methacrylic resin [2] having a Mw of 81400, a molecular weight distribution of 1.08, a syndiotacticity (rr) of 73%, a glass transition temperature of 131° C. and the content of a structural unit derived from methyl methacrylate of 100% by mass.

Preparation Example 3

A 5-L glass reaction vessel equipped with a stirrer blade and a three-way stop cock was purged with nitrogen. Into this, charged under room temperature were 1600 g of toluene, 2.49 g (10.8 mmol) of 1,1,4,7,10,10-hexamethyl-triethylenetetramine, 53.5 g (30.9 mmol) of a 0.45 M toluene solution of isobutylbis(2,6-di-t-butyl-4-methylphenoxy)aluminum and 6.17 g (10.3 mmol) of a 1.3 M solution (solvent: 95% of cyclohexane and 5% of n-hexane) of sec-butyl-lithium. To this, 550 g of distillated methyl methacrylate was added dropwise at −20° C. with stirring over 30 minutes. After the completion of dropwise addition, it was stirred at −20° C. for 180 minutes. The color of the solution changed from yellow to clear. The polymerization conversion ratio of methyl methacrylate was 100% at this time.

To the resulting solution, 1500 g of toluene was added for dilution. Subsequently, the above diluted solution was poured into 100 kg of methanol to obtain a precipitate. The precipitate obtained was dried at 80° C., 140 Pa for 24 hours to obtain a methacrylic resin [3] having a Mw of 96100, a molecular weight distribution of 1.07, a syndiotacticity (rr) of 83%, a glass transition temperature of 133° C. and the content of a structural unit derived from methyl methacrylate of 100% by mass.

Preparation Example 4

A 5-L glass reaction vessel equipped with a stirrer blade and a three-way stop cock was purged with nitrogen. To this, charged under room temperature were 1600 g of toluene, 1.45 g (6.3 mmol) of 1,1,4,7,10,10-hexamethyltriethylenete-tramine, 31.2 g (18.0 mmol) of a 0.45 M toluene solution of isobutylbis(2,6-di-t-butyl-4-methylphenoxy)aluminum and 3.60 g (6.0 mmol) of a 1.3 M solution (solvent: 95% of cyclohexane and 5% of n-hexane) of sec-butyllithium. To this, 550 g of distillated methyl methacrylate was added dropwise at 0° C. with stirring over 30 minutes. After the completion of dropwise addition, it was stirred at 0° C. for 120 minutes. The color of the solution changed from yellow to clear. The polymerization conversion ratio of methyl methacrylate was 100% at this time. To the resulting solution, 1500 g of toluene was added for dilution. Subsequently, the above diluted solution was poured into 100 kg of methanol to obtain a precipitate. The precipitate obtained was dried at 80° C., 140 Pa for 24 hours to obtain a methacrylic resin [4] having a Mw of 131600, a molecular weight distribution of 1.10, a syndiotacticity (rr) of 78%, a glass transition temperature of 133° C. and the content of a structural unit derived from methyl methacrylate of 100% by mass.

Preparation Example 5

A 5-L glass reaction vessel equipped with a stirrer blade and a three-way stop cock was purged with nitrogen. To this, charged under room temperature were 1600 g of toluene, 3.77 g (16.4 mmol) of 1,1,4,7,10,10-hexamethyltriethylenetetramine, 81.0 g (46.8 mmol) of a 0.45 M toluene solution of isobutylbis(2,6-di-t-butyl-4-methylphenoxy)aluminum and 9.35 g (15.6 mmol) of a 1.3M solution (solvent: 95% of cyclohexane and 5% of n-hexane) of sec-butyllithium. To this, 550 g of distillated methyl methacrylate was added dropwise at 0° C. with stirring over 30 minutes. After the completion of dropwise addition, it was stirred at 0° C. for 120 minutes. The color of the solution changed from yellow to clear. The polymerization conversion ratio of methyl methacrylate was 100% at this time. To the resulting solution, 1500 g of toluene was added for dilution. Subsequently, the above diluted solution was poured into 100 kg of methanol to obtain a precipitate. The precipitate obtained was dried at 80° C., 140 Pa for 24 hours to obtain a methacrylic resin [5] having a Mw of 49300, a molecular weight distribution of 1.12, a syndiotacticity (rr) of 78%, a glass transition temperature of 132° C. and the content of a structural unit derived from methyl methacrylate of 100% by mass.

Preparation Example 6

An autoclave having a stirrer and a sampling tube was purged with nitrogen. To this, added were 100 parts by mass of refined methyl methacrylate, 0.0052 part by mass of 2,2'-azobis(2-methylpropionitrile) (hydrogen abstraction ability: 1%, 1-hour half-life temperature: 83° C.) and 0.28 part by mass of n-octylmercaptan, and stirred to obtain a raw material liquid. Nitrogen was sent into this raw material liquid to remove dissolved oxygen in the raw material liquid.

The raw material liquid was transferred into a tank reactor connected with the autoclave through piping up to ⅔ of the capacity. The temperature was maintained at 140° C., and a polymerization reaction was first initiated in a batch manner. Once the polymerization conversion ratio reached 55% by mass, the raw material liquid was fed into the tank reactor from the autoclave at a flow rate so that the mean residence time was 150 minutes while the reaction liquid was withdrawn from the tank reactor at a flow rate corresponding to the feeding flow rate of the raw material liquid and maintained at a temperature of 140° C., switching the mode of the polymerization reaction to the continuous flow manner. The steady-state polymerization conversion ratio was 55% by mass after switched.

The reaction liquid withdrawn from the tank reactor in the steady state was fed into a multitubuler heat exchanger with an internal temperature of 230° C. at a flow rate so that the mean residence time was 2 minutes for heating. Subsequently, the heated reaction liquid was introduced into a flash evaporator to remove volatile matters mainly comprising unreacted monomers, and then a melt resin was obtained. The melt resin from which volatile matters were removed was fed to a twin screw extruder with an internal temperature of 260° C., and discharged in a strand form, and cut with a pelletizer to obtain a pelleted methacrylic resin [6] having a Mw of 82000, a molecular weight distribution of 1.85, a syndiotacticity (rr) of 52%, a glass transition temperature of 120° C. and the content of a structural unit derived from methyl methacrylate of 100% by mass.

Preparation Example 7

The same operations were performed as in Preparation Example 6 except that the amount of n-octylmercaptan was changed to 0.30 part by mass to obtain a methacrylic resin [7] having a Mw of 76400 g/mol, a molecular weight distribution (Mw/Mn) of 1.81, a syndiotacticity (rr) of 53%, a glass transition temperature of 119° C. and the content of a structural unit derived from methyl methacrylate of 100% by mass.

Preparation Example 8

The same operations were performed as in Preparation Example 6 except that 100 parts by mass of methyl methacrylate was changed to 99 parts by mass of methyl methacrylate and 1 part by mass of methyl acrylate, and the amount of n-octylmercaptan was changed to 0.26 part by mass to obtain a methacrylic resin [8] having a Mw of 88900, a molecular weight distribution of 1.88, a syndiotacticity (rr) of 51%, a glass transition temperature of 118° C. and the content of a structural unit derived from methyl methacrylate of 99.3% by mass.

Preparation Example 9

The same operations were performed as in Preparation Example 6 except that the amount of 2,2'-azobis(2-methylpropionitrile) was changed to 0.0080 part by mass, and the amount of n-octylmercaptan was changed to 0.40 part by mass, and the temperature in the tank reactor was changed to 120° C., and the mean residence time was changed to 120 minutes to obtain a methacrylic resin [9] having a Mw of 57800, a molecular weight distribution of 1.82, a syndiotacticity (rr) of 56%, a glass transition temperature of 122° C. and the content of a structural unit derived from methyl methacrylate of 100% by mass.

Preparation Example 10

The same operations were performed as in Preparation Example 6 except that the amount of n-octylmercaptan was changed to 0.42 part by mass to obtain a methacrylic resin [10] having a Mw of 55500, a molecular weight distribution of 1.76, a syndiotacticity (rr) of 50%, a glass transition temperature of 118° C. and the content of a structural unit derived from methyl methacrylate of 100% by mass.

Preparation Example 11

The same operations were performed as in Preparation Example 6 except that 100 parts by mass of methyl methacrylate was changed to 93.7 parts by mass of methyl methacrylate and 6.3 parts by mass of methyl acrylate, and the amount of 2,2'-azobis(2-methylpropionitrile) was changed to 0.0075 part by mass, and the amount of n-octylmercaptan was changed to 0.25 part by mass, and the temperature in the tank reactor was changed to 180° C., and the mean residence time was changed to 60 minutes to obtain a methacrylic resin [11] having a Mw of 84400, a molecular weight distribution of 2.26, a syndiotacticity (rr)

of 47%, a glass transition temperature of 115° C. and the content of a structural unit derived from methyl methacrylate of 95.0% by mass.

Preparation Example 12

The same operations were performed as in Preparation Example 6 except that the amount of 2,2'-azobis(2-methylpropionitrile) was changed to 0.32 part by mass, and the amount of n-octylmercaptan was changed to 0.32 part by mass, and the temperature in the tank reactor was changed to 60° C., and the mean residence time was changed to 300 minutes to obtain a methacrylic resin [12] having a Mw of 78600, a molecular weight distribution of 1.79, a syndiotacticity (rr) of 64%, a glass transition temperature of 124° C. and the content of a structural unit derived from methyl methacrylate of 100% by mass.

Preparation Example 13

The same operations were performed as in Manufacturing Example 6 except that the amount of n-octylmercaptan was changed to 0.225 part by mass to obtain a methacrylic resin [50] having a Mw of 103600, a molecular weight distribution of 1.81, a syndiotacticity (rr) of 52%, a glass transition temperature of 120° C. and the content of a structural unit derived from methyl methacrylate of 100% by mass.

Example 1

50 parts by mass of the methacrylic resin [1] was mixed with 50 parts by mass of the methacrylic resin [6], and melt-kneaded at 230° C. for 3 minutes with a Labo Plastomill (Toyo Seiki Kogyo Co., Ltd.) to manufacture a methacrylic resin [13]. The physical properties of the methacrylic resin [13] are shown in Table 1. In the table, the MMA unit content means a proportion of a structural unit derived from methyl methacrylate.

The methacrylic resin [13] was dried at 80° C. for 12 hours. Using a 20 mm φ single screw extruder (from OCS), the methacrylic resin [13] was extruded at a resin temperature of 260° C. through a T-die with a width of 150 mm, and fed into a roll with a surface temperature of 85° C. to obtain an unstretched film with a width of 100 nm and a thickness of 180 μm. Evaluation results for the variation in thickness and surface smoothness of unstretched films manufactured between 10 minutes and 30 minutes after the start of extrusion are shown in Table 1.

The unstretched film obtained by the aforementioned approach was cut out into 50 mm×40 mm, and placed in a tensile testing machine (Shimadzu AG-IS 5 kN) so that the distance between chucks was 40 mm, and stretched at a stretching temperature of 15° C. above the glass transition temperature, a stretching rate of 500%/min. and a stretching ratio of two times in one direction. After maintained for 10 seconds, quenching was performed to obtain a uniaxially stretched film with a thickness of 100 μm. Measurement results for thermal shrinkage ratio of the resulting uniaxially stretched films are shown in Table 1.

Further, the unstretched film obtained by the aforementioned approach was cut out into 100 mm×100 mm, and sequentially stretched biaxially with a pantograph-type biaxial stretching testing machine (Toyo Seiki Kogyo Co., Ltd.) at a stretching temperature of 15° C. above the glass transition temperature, a stretching rate of 500%/min. in one direction and a stretching ratio of two times in one direction. After maintained for 10 seconds, quenching was performed to obtain a biaxially stretched film with a thickness of 40 μm. Measurement results for the total light transmittance, haze and yellow index of the resulting biaxially stretched films are shown in Table 1.

[Table 1]

TABLE 1

| | Examples | | | | | | |
|---|---|---|---|---|---|---|---|
| | 1 | 2 | 3 | 4 | 5 | 6 | 7 |
| Methacrylic resin | [13] | [14] | [15] | [16] | [17] | [18] | [19] |
| Methacrylic resin[1] [Parts by mass] | 50 | 50 | 50 | 70 | 40 | 50 | 60 |
| Methacrylic resin[6] [Parts by mass] | 50 | 50 | 50 | 30 | | | |
| Methacrylic resin[7] [Parts by mass] | | | | | 60 | 50 | 40 |
| Processing aid [Parts by mass] | | 1 | | | | | |
| UV absorber [Parts by mass] | | | 1 | | | | |
| MMA unit content [mass %] | 100 | 100 | 100 | 100 | 100 | 100 | 100 |
| Weight average molecular weight (Mw) | 72,200 | 77,500 | 72,200 | 68,200 | 71,500 | 68,600 | 72,600 |
| Molecular weight distribution | 1.43 | 1.54 | 1.43 | 1.27 | 1.58 | 1.40 | 1.44 |
| Ratio of fractions with a molecular weight of less than 15000 [%] | 2.37 | 2.45 | 2.37 | 1.44 | 3.80 | 2.50 | 2.23 |
| Ratio of fractions with a molecular weight of not less than 200000 [%] | 2.45 | 3.03 | 2.45 | 1.49 | 2.50 | 1.80 | 2.20 |
| Triad syndiotacticity(rr)[%] | 62 | 62 | 62 | 67 | 60 | 62 | 63 |
| Glass transition temperature [° C.] | 125 | 125 | 125 | 127 | 124 | 125 | 126 |
| MFR(230° C. 3.8 Kg) [g/10 min] | 2.6 | 2.6 | 2.6 | 2.4 | 2.9 | 2.6 | 2.7 |
| Thermal decomposition resistance | A | A | A | A | A | A | A |
| Variation in thickness | A | A | A | B | A | A | A |
| Surface smoothness | A | A | A | A | A | A | A |
| Thermal shrinkage ratio [%] | 5.7 | 6.0 | 5.7 | 4.2 | 8.1 | 7.1 | 5.9 |
| Total light transmittance [%] | 93 | 93 | 93 | 93 | 93 | 93 | 93 |
| Haze [%] | 0.1 | 0.1 | 0.1 | 0.1 | 0.1 | 0.1 | 0.1 |
| Yellow index(YI) | A | A | A | A | A | A | A |

Example 2

50 parts by mass of the methacrylic resin [1] was mixed with 50 parts by mass of the methacrylic resin [6] and 1 part by mass of a processing aid (Paraloid K125-P; Kureha Chemical Industry Co., Ltd.), and melt-kneaded at 230° C. for 3 minutes using a Labo Plastomill (Toyo Seiki Kogyo Co., Ltd.) to manufacture a methacrylic resin [14]. The physical properties of the methacrylic resin [14] are shown in Table 1.

An unstretched film as well as a uniaxially stretched film and a biaxially stretched film were manufactured for evaluation by the same method as in Example 1 except that the methacrylic resin [14] was used instead of the methacrylic resin [13]. Evaluation results are shown in Table 1.

Example 3

50 parts by mass of the methacrylic resin [1] was mixed with 50 parts by mass of the methacrylic resin [6] and 1 part by mass of an ultraviolet absorber (ADK STAB LA-31; ADEKA Corp.), and melt-kneaded at 230° C. for 3 minutes using a Labo Plastomill (Toyo Seiki Kogyo Co., Ltd.) to manufacture a methacrylic resin [15]. The physical properties of the methacrylic resin [15] are shown in Table 1.

An unstretched film as well as a uniaxially stretched film and a biaxially stretched film were manufactured for evaluation by the same method as in Example 1 except that the methacrylic resin [15] was used instead of the methacrylic resin [13]. Evaluation results are shown in Table 1.

Examples 4 to 12

Methacrylic resins [16] to [24] were manufactured by the same method as in Example 1 except that the recipes as shown in Tables 1 and 2 were used. The physical properties of methacrylic resins [16] to [24] are shown in Tables 1 and 2.

An unstretched film as well as a uniaxially stretched film and a biaxially stretched film were manufactured for evaluation by the same method as in Example 1 except that the methacrylic resins [16] to [24] were used instead of the methacrylic resin [13]. Evaluation results are shown in Tables 1 and 2.

Example 13

33 parts by mass of the methacrylic resin [2], 33 parts by mass of the methacrylic resin [4], 34 parts by mass of the methacrylic resin [5] and 1 part by mass of a processing aid (Paraloid K125-P; Kureha Chemical Industry Co., Ltd.) were mixed, and melt-kneaded at 230° C. for 3 minutes using a Labo Plastomill (Toyo Seiki Kogyo Co., Ltd.) to manufacture a methacrylic resin [25]. The physical properties of the methacrylic resin [25] are shown in Table 2.

An unstretched film as well as a uniaxially stretched film and a biaxially stretched film were manufactured for evaluation by the same method as in Example 1 except that the methacrylic resin [25] was used instead of the methacrylic resin [13]. Evaluation results are shown in Table 2.

Example 14

The methacrylic resin [12] was melt-kneaded at 230° C. for 3 minutes using a Labo Plastomill (Toyo Seiki Kogyo Co., Ltd.), and then dried at 80° C. for 12 hours.

An unstretched film as well as a uniaxially stretched film and a biaxially stretched film were manufactured for evaluation by the same method as in Example 1 except that the dried methacrylic resin [12] was used instead of the methacrylic resin [13].

Evaluation results are shown in Table 2.

TABLE 2

| | Examples | | | | | | |
|---|---|---|---|---|---|---|---|
| | 8 | 9 | 10 | 11 | 12 | 13 | 14 |
| Methacrylic resin | [20] | [21] | [22] | [23] | [24] | [25] | [12] |
| Methacrylic resin[1] [Parts by mass] | 60 | | | | | | |
| Methacrylic resin[2] [Parts by mass] | | 50 | 50 | 50 | | 33 | |
| Methacrylic resin[3] [Parts by mass] | | | | | 40 | | |
| Methacrylic resin[4] [Parts by mass] | | | | | | 33 | |
| Methacrylic resin[5] [Parts by mass] | | | | | | 34 | |
| Methacrylic resin[8] [Parts by mass] | 40 | | | | | | |
| Methacrylic resin[9] [Parts by mass] | | 50 | | | | | |
| Methacrylic resin[10][Parts by mass] | | | 50 | | 60 | | |
| Methacrylic resin[11][Parts by mass] | | | | 50 | | | |
| Methacrylic resin[12][Parts by mass] | | | | | | | 100 |
| Processing aid [Parts by mass] | | | | | | 1 | |
| MMA unit content [mass %] | 99.7 | 100 | 100 | 97.5 | 100 | 100 | 100 |
| Weight average molecular weight (Mw) | 73,800 | 69,600 | 68,400 | 82,900 | 71,700 | 82,600 | 78,600 |
| Molecular weight distribution | 1.36 | 1.56 | 1.53 | 1.62 | 1.68 | 1.31 | 1.79 |
| Ratio of fractions with a molecular weight of less than 15000 [%] | 1.58 | 4.20 | 4.40 | 3.70 | 4.90 | 0.23 | 4.79 |
| Ratio of fractions with a molecular weight of not less than 200000 [%] | 2.70 | 0.41 | 0.37 | 4.30 | 0.46 | 0.27 | 4.16 |
| Triad syndiotacticity(rr)[%] | 63 | 62 | 62 | 60 | 63 | 73 | 64 |
| Glass transition temperature [° C.] | 126 | 124 | 124 | 123 | 124 | 131 | 124 |
| MFR(230° C. 3.8 Kg) [g/10 min] | 2.2 | 4.0 | 2.4 | 2.7 | 3.4 | 1.3 | 1.8 |
| Thermal decomposition resistance | A | A | A | A | A | A | B |
| Variation in thickness | A | A | A | A | A | A | A |
| Surface smoothness | A | A | A | A | A | A | A |
| Thermal shrinkage ratio [%] | 5.5 | 5.8 | 7.6 | 8.0 | 6.3 | 2.8 | 6.1 |
| Total light transmittance [%] | 93 | 93 | 93 | 93 | 93 | 93 | 93 |
| Haze [%] | 0.1 | 0.1 | 0.1 | 0.1 | 0.1 | 0.1 | 0.1 |
| Yellow index(YI) | A | A | A | A | A | A | A |

Comparative Examples 1 to 6

An unstretched film as well as a uniaxially stretched film and a biaxially stretched film were manufactured for evaluation by the same method as in Example 14 except that the methacrylic resins shown in Table 3 were used instead of the methacrylic resin [12]. Evaluation results are shown in Table 3.

PC1: product from Mitsubishi Engineering Plastics Corporation, Iupilon HL-8000 (model number), MVR (300° C., 1.2 kg)=136 cm$^3$/10 min.
PC2: product from Sumika Styron Polycarbonate Limited, SD POLYCA TR-2001 (model number), MVR (300° C., 1.2 kg)=200 cm$^3$/10 min.
PC3: product from Idemitsu Kosan Co., Ltd., Tarflon LC1700 (model number), MVR (300° C., 1.2 kg)=40 cm$^3$/min.

TABLE 3

|  | Comp. Examples | | | | | |
| --- | --- | --- | --- | --- | --- | --- |
|  | 1 | 2 | 3 | 4 | 5 | 6 |
| Methacrylic resin | [7] | [10] | [1] | [2] | [4] | [5] |
| Methacrylic resin[1] [Parts by mass] |  |  | 100 |  |  |  |
| Methacrylic resin[2] [Parts by mass] |  |  |  | 100 |  |  |
| Methacrylic resin[4] [Parts by mass] |  |  |  |  | 100 |  |
| Methacrylic resin[5] [Parts by mass] |  |  |  |  |  | 100 |
| Methacrylic resin[7] [Parts by mass] | 100 |  |  |  |  |  |
| Methacrylic resin[10][Parts by mass] |  | 100 |  |  |  |  |
| MMA unit content [mass %] | 100 | 100 | 100 | 100 | 100 | 100 |
| Weight average molecular weight (Mw) | 76,400 | 55,500 | 58,900 | 81,400 | 131,600 | 49,300 |
| Molecular weight distribution | 1.81 | 1.76 | 1.06 | 1.08 | 1.10 | 1.12 |
| Ratio of fractions with a molecular weight of less than 15000 [%] | 4.97 | 8.78 | 0.025 | 0.19 | 0.023 | 0.81 |
| Ratio of fractions with a molecular weight of not less than 200000 [%] | 3.70 | 0.76 | 0.00 | 0.020 | 0.90 | 0.00 |
| Triad syndiotacticity(rr)[%] | 53 | 50 | 74 | 73 | 78 | 78 |
| Glass transition temperature [° C.] | 119 | 118 | 130 | 131 | 133 | 132 |
| MFR(230° C. 3.8 Kg) [g/10 min] | 3.6 | 10 | 2.1 | 0.9 | 0.11 | 3.7 |
| Thermal decomposition resistance | B | B | A | A | A | A |
| Variation in thickness | A | A | C | C | C | C |
| Surface smoothness | A | A | B | B | B | B |
| Thermal shrinkage ratio [%] | 19 | 22 | 3.1 | 2.7 | 2.1 | 2.4 |
| Total light transmittance [%] | 93 | 93 | 91 | 91 | 90 | 91 |
| Haze [%] | 0.1 | 0.1 | 0.2 | 0.5 | 1.1 | 0.2 |
| Yellow index(YI) | A | A | B | B | B | B |

The above results indicate that the film according to the present invention has a high transparency, a low thermal shrinkage ratio, a uniform thickness and an excellent surface smoothness.

Examples 15 to 23

A methacrylic resin [26] or methacrylic resin compositions [27] to [34] were manufactured by the same method as in Example 1 except that the recipes shown in Tables 4 and 5 were used. The physical properties of the methacrylic resin [26] or the methacrylic resin compositions [27] to [34] are shown in Tables 4 and 5.

An unstretched film as well as a uniaxially stretched film and a biaxially stretched film were manufactured for evaluation by the same method as in Example 1 except that the methacrylic resin [26] or the methacrylic resin compositions [27] to [34] were used instead of the methacrylic resin [13]. Evaluation results are shown in Table 4. For Examples 16 to 23, measured values for methacrylic resin compositions comprising a methacrylic resin and a polycarbonate resin are shown except for the MMA unit content and the triad syndiotacticity.

The polycarbonate resins used in the Examples are the following 5 types.

PC4: product from Mitsubishi Engineering Plastics Corporation, AL071; MVR (300° C., 1.2 kg)=not less than 1000 cm$^3$/10 min. (accurate measurements were difficult due to high fluidity), My=5500.

PC5: a mixture comprising 50 parts by mass of PC2 and 50 parts by mass of PC4; MVR (300° C., 1.2 kg)=not less than 1000 cm$^3$/10 min (accurate measurements were difficult due to high fluidity), My=8500.

Comparative Example 7

An unstretched film as well as a uniaxially stretched film and a biaxially stretched film were manufactured for evaluation by the same method as in Example 14 except that the methacrylic resin [50] was used instead of the methacrylic resin [12]. Evaluation results are shown in Table 4.

Comparative Example 4

The biaxially stretched film obtained from Comparative Example 4 described above was further evaluated for the phase difference (Rth) in the direction of film thickness. Evaluation results are shown in Table 4.

TABLE 4

|  | Ex. | | | | Comp.Ex. | |
| --- | --- | --- | --- | --- | --- | --- |
|  | 15 | 16 | 17 | 18 | 4 | 7 |
| Methacrylic resin or Methacrylic resin composition | [26] | [27] | [28] | [29] | [2] | [50] |
| Methacrylic resin[2] [Parts by mass] | 57 | 57 | 57 | 57 | 100 |  |
| Methacrylic resin[50][Parts by mass] | 43 | 43 | 43 | 43 |  | 100 |
| Polycarbonate resin[PC1] [Parts by mass] |  | 2 | 4 | 6 |  |  |
| MMA unit content [mass %] | 100 | 100 | 100 | 100 | 100 | 100 |
| Weight average molecular weight (Mw) | 88,600 | 84,000 | 77,300 | 75,200 | 81,400 | 103,600 |
| Molecular weight distribution | 1.32 | 1.48 | 1.60 | 1.62 | 1.08 | 1.81 |
| Ratio of fractions with a molecular weight of less than 15000 [%] | 0.98 | 1.80 | 3.85 | 3.99 | 0.19 | 2.28 |
| Ratio of fractions with a molecular weight of not less than 200000 [%] | 4.50 | 4.12 | 3.41 | 3.20 | 0.020 | 10.5 |
| Triad syndiotacticity(rr)[%] | 62 | 62 | 62 | 62 | 73 | 52 |
| Glass transition temperature [° C.] | 126 | 126 | 126 | 126 | 131 | 120 |
| MFR(230° C. 3.8 Kg) [g/10 min] | 1.3 | 1.3 | 1.4 | 1.5 | 0.9 | 1.4 |
| Thermal decomposition resistance | A | A | A | A | A | B |
| Variation in thickness | A | A | A | A | C | A |
| Surface smoothness | A | A | A | A | B | A |
| Thermal shrinkage ratio [%] | 5.6 | 5.6 | 5.3 | 5.1 | 2.7 | 15 |
| Total light transmittance [%] | 93 | 93 | 93 | 92 | 91 | 93 |
| Haze [%] | 0.1 | 0.1 | 0.1 | 0.1 | 0.5 | 0.1 |
| Yellow index(YI) | A | A | A | A | B | A |
| Phase difference in thickness direction(Rth)[nm] | −19 | −12 | −1.3 | 16 | −23 | −14 |

*The MMA unit content is a value based on the total amount of methacrylic resin.

TABLE 5

|  | Ex. | | | | |
| --- | --- | --- | --- | --- | --- |
|  | 19 | 20 | 21 | 22 | 23 |
| Methacrylic resin or Methacrylic resin composition | [30] | [31] | [32] | [33] | [34] |
| Methacrylic resin [2] [Parts by mass] | 57 | 57 | 57 | 57 | 57 |
| Methacrylic resin [50] [Parts by mass] | 43 | 43 | 43 | 43 | 43 |
| Polycarbonate resin [PC2] [Parts by mass] | 4 | 2.8 |  |  |  |
| Polycarbonate resin [PC3] [Parts by mass] |  |  | 2.5 |  |  |
| Polycarbonate resin [PC4] [Parts by mass] |  |  |  | 4 |  |
| Polycarbonate resin [PC5] [Parts by mass] |  |  |  |  | 3.5 |
| Processing aid [Parts by mass] | 2 | 2 | 2 | 2 | 2 |
| MMA unit content [mass %] | 100 | 100 | 100 | 100 | 100 |
| Weight average molecular weight (Mw) | 90,000 | 95,000 | 96,200 | 93,500 | 98,000 |
| Molecular weight distribution | 1.89 | 1.80 | 1.78 | 2.28 | 2.08 |
| Ratio of fractions with a molecular weight of less than 15000 [%] | 4.18 | 4.01 | 4.1 | 4.97 | 4.24 |
| Ratio of fractions with a molecular weight of not less than 200000 [%] | 4.52 | 4.26 | 3.11 | 4.57 | 5.32 |
| Triad syndiotacticity (rr) [%] | 62 | 62 | 62 | 62 | 62 |
| Glass transition temperature [° C.] | 126 | 126 | 126 | 124 | 124 |
| MFR (230° C. 3.8 Kg) [g/10 min] | 1.4 | 1.3 | 1.3 | 1.7 | 1.5 |
| Thermal decomposition resistance | A | A | A | A | A |
| Variation in thickness | A | A | A | A | A |
| Surface smoothness | A | A | A | A | A |
| Thermal shrinkage ratio [%] | 5.2 | 5.0 | 5 | 9.2 | 7.5 |
| Total light transmittance [%] | 93 | 93 | 92 | 93 | 93 |
| Haze [%] | 0.1 | 0.1 | 0.2 | 0.1 | 0.1 |
| Yellow index (YI) | A | A | A | A | A |
| Phase difference in thickness direction (Rth) [nm] | 2.0 | −0.4 | −0.5 | −0.3 | −0.2 |

*The MMA unit content is a value based on the total amount of methacrylic resin.

The above results indicate that in the case of the film according to the present invention comprising a resin composition comprising a polycarbonate resin, the phase difference (Rth) in the direction of film thickness can be adjusted by the content of the polycarbonate resin.

The invention claimed is:

1. A film comprising:
    a methacrylic resin (A) which has
    a triad syndiotacticity (rr) of not less than 58%,
    a weight average molecular weight of 50000 to 150000,
    a content of fraction having a molecular weight of not less than 200000 of 0.1 to 10%, and
    a content of fraction having a molecular weight of less than 15000 of 0.2 to 5%.

2. The film according to claim 1, wherein the methacrylic resin (A) comprises not less than 99% by mass of a structural unit derived from methyl methacrylate.

3. The film according to claim 1, wherein the methacrylic resin (A) has a melt flow rate of not less than 0.1 g/10 min. and not more than 10 g/10 min. as measured at a temperature of 230° C. and a load of 3.8 kg.

4. A polarizer protective film comprising the film according to claim 1.

5. A film comprising:
    100 parts by mass of a methacrylic resin (A) which has a triad syndiotacticity (rr) of not less than 58%, a weight average molecular weight of 50000 to 150000, a content of fraction having a molecular weight of not less than 200000 of 0.1 to 10%, and a content of fraction with a molecular weight of less than 15000 of 0.2 to 5%; and
    1 to 10 parts by mass of a polycarbonate resin.

6. The film according to claim 5, wherein the methacrylic resin (A) comprises not less than 99% by mass of a structural unit derived from methyl methacrylate.

7. The film according to claim 5, wherein the methacylic resin (A) has a melt flow rate of not less than 0.1 g/10 min. and not more than 10 g/10 min. as measured at a temperature of 230° C. and a load of 3.8 kg.

8. A polarizer protective film comprising the film according to claim 5.

9. A method for manufacturing a film, the method comprising forming a methacrylic resin composition into a film, the methacrylic resin composition comprising a methacrylic resin (A) which has a triad syndiotacticity (rr) of not less than 58%, a weight average molecular weight of 50000 to 150000, a content of fraction having a molecular weight of not less than 200000 of 01 to 10%, and a content of fraction having a molecular weight of less than 15000 of 0.2 to 5%.

10. The manufacturing method according to claim 9, further comprising obtaining the methacrylic resin (A) by an anionic polymerization method.

11. The manufacturing method according to claim 9, further comprising obtaining the methacrylic resin (A) by mixing a methacrylic resin (1) with a methacrylic resin (2) different from the methacrylic resin (1).

12. The manufacturing method according to claim 9, further comprising obtaining the methacrylic resin (A) by mixing a methacrylic resin (I) manufactured by the anionic polymerization method with a methacrylic resin (II) manufactured by a radical polymerization method.

13. The manufacturing method according to claim 9, further comprising obtaining the methacrylic resin composition by melt-kneading the methacrylic resin (A) with a polycarbonate resin or a polyester resin.

* * * * *